United States Patent
Hwang et al.

(10) Patent No.: US 7,191,508 B2
(45) Date of Patent: Mar. 20, 2007

(54) METHOD FOR MANUFACTURING THIN-FILM MAGNETIC HEAD SLIDERS

(75) Inventors: Cherngye Hwang, San Jose, CA (US); Kim Y. Lee, Fremont, CA (US); Gary McClelland, Palo Alto, CA (US); Dennis Richard McKean, Milpitas, CA (US); Timothy Clark Reiley, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 268 days.

(21) Appl. No.: 10/917,591

(22) Filed: Aug. 13, 2004

(65) Prior Publication Data
US 2005/0091836 A1 May 5, 2005

Related U.S. Application Data

(63) Continuation-in-part of application No. 10/675,106, filed on Sep. 30, 2003, now abandoned.

(51) Int. Cl.
*G11B 5/127* (2006.01)
*H04R 31/00* (2006.01)

(52) U.S. Cl. ............... 29/603.12; 29/603.07; 156/232; 156/235; 264/236; 264/310; 427/240; 427/372.2; 451/5; 451/41

(58) Field of Classification Search ............. 29/603.07, 29/603.12; 156/232, 235; 264/236, 310; 427/240, 372.2; 451/5, 41; 360/122, 126, 360/317
See application file for complete search history.

(56) References Cited

U.S. PATENT DOCUMENTS

| | | | | |
|---|---|---|---|---|
| 5,294,257 | A * | 3/1994 | Kelly et al. | 118/52 |
| 6,511,156 | B1 * | 1/2003 | Kazama et al. | 347/47 |
| 6,656,313 | B2 * | 12/2003 | Egitto et al. | 156/272.6 |
| 6,725,526 | B2 * | 4/2004 | Lille | 29/603.1 |

* cited by examiner

*Primary Examiner*—Paul D. Kim
(74) *Attorney, Agent, or Firm*—Lewis L. Nunnelley; Matthew S. Zises

(57) ABSTRACT

A method for manufacturing thin-film magnetic head sliders is disclosed. Initially, an elastic layer, which may be made of poly-dimethyl siloxane (PDMS), is spun on a wafer and is thermally cured. Then, a resist layer is spun on the elastic layer. Both the resist layer and the elastic layer are subsequently peeled off together from the wafer. Next, the peeled resist layer/elastic layer is applied onto a group of magnetic heads with the resist layer in direct contact with the magnetic heads. Finally, the elastic layer is peeled off from the resist layer such that the resist layer remains attaching to the magnetic heads.

8 Claims, 5 Drawing Sheets

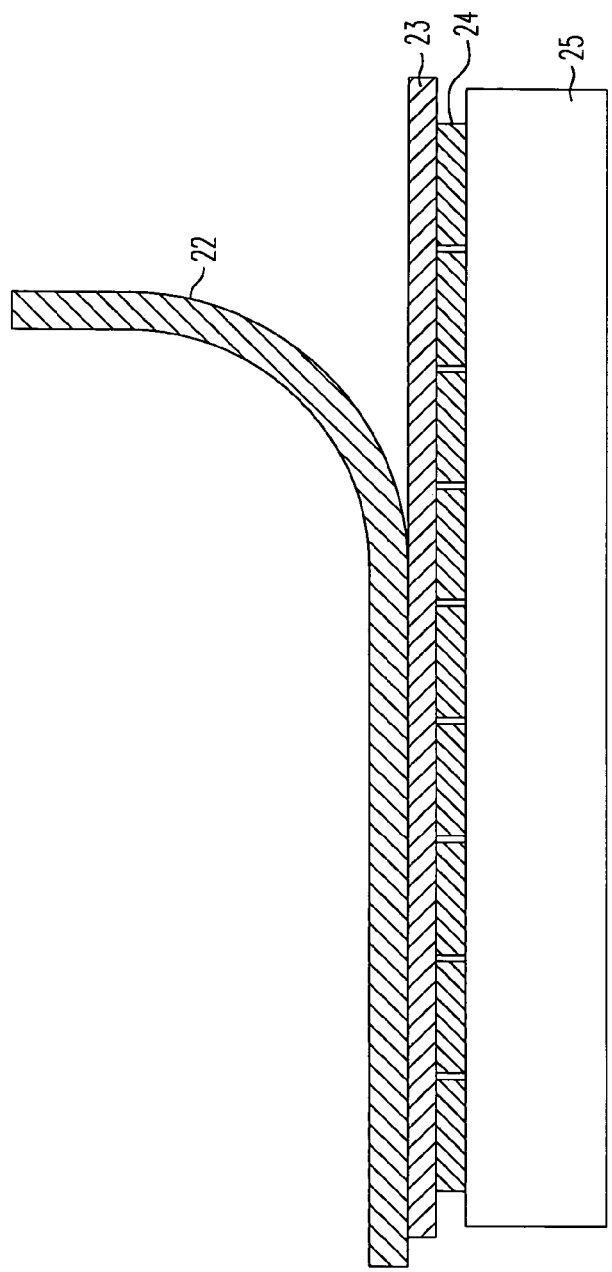
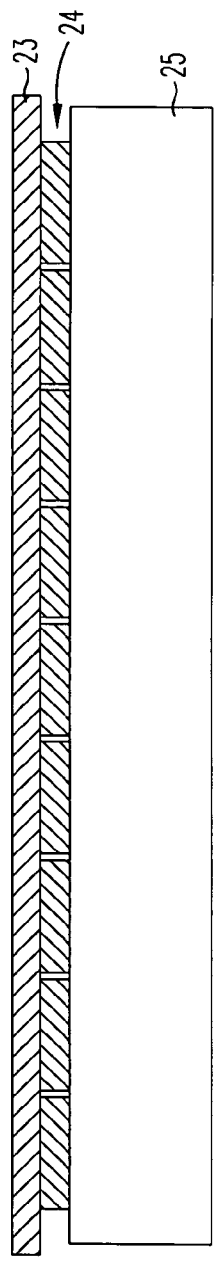
FIG. 2e
FIG. 2f

METHOD FOR MANUFACTURING THIN-FILM MAGNETIC HEAD SLIDERS

RELATED PATENT APPLICATION

The present patent application is a continuation-in-part of a U.S. patent application Ser. No. 10/675,106, filed on Sep. 30, 2003, now abandoned.

BACKGROUND OF THE INVENTION

1. Technical Field

The present invention relates to magnetic heads in general, and, in particular, to magnetic heads used in magnetic storage devices. Still more particularly, the present invention relates to a method for manufacturing sliders for magnetic thin-film heads to be used in magnetic storage devices.

2. Description of Related Art

In a magnetic recording apparatus such as a hard disk drive, a magnetic head is typically utilized to facilitate the process of information recording. Currently, thin-film magnetic heads are built upon a wafer, which is then cut into pieces, and, after further processing, is converted into sliders. A thin-film magnetic head slider is disposed so as to face a recording surface of a magnetic recording medium such as a disk within a hard disk drive.

Conventionally, a thin-film magnetic head slider is manufactured according to the following steps. First, multiple thin-film magnetic heads are formed on a wafer made of a ceramic material. Subsequently, the wafer is cut into multiple bars, called rows, by using a dicing saw or the like. Each of the rows includes multiple magnetic head sliders. Surfaces of the rows are lapped and polished. Next, a surface of each of the magnetic head sliders is etched to a predetermined shape by an etching process to form an air-bearing surface. Finally, each row is cut into individual magnetic head sliders.

The present disclosure provides an improved method for manufacturing thin-film sliders for magnetic heads to be used in magnetic storage devices, particularly in the area of improving the etching process for air-bearing surfaces.

SUMMARY OF THE INVENTION

In accordance with a preferred embodiment of the present invention, an elastic layer, which may be made of polydimethyl siloxane (PDMS), is initially spun on a wafer and is thermally cured. Then, a resist layer is spun on the elastic layer. Both the resist layer and the elastic layer are subsequently peeled off together from the wafer. Next, the peeled resist layer/elastic layer is applied onto a group of magnetic heads with the resist layer in direct contact with the magnetic heads. Finally, the elastic layer is peeled off from the resist layer such that the resist layer remains attaching to the magnetic heads.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 2a–2f are graphical illustrations of a method for manufacturing thin-film magnetic head sliders, in accordance with a preferred embodiment of the present invention.

DETAILED DESCRIPTION OF A PREFERRED EMBODIMENT

Figure 1A:
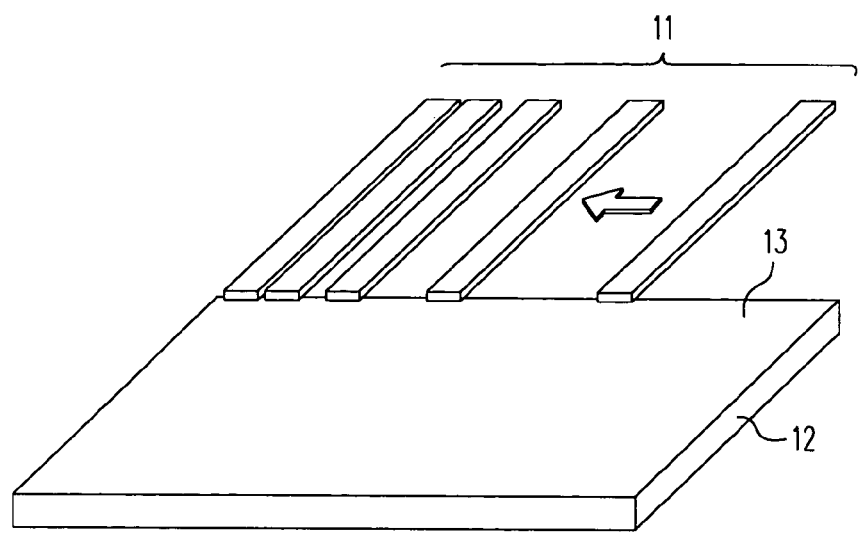
FIGS. 1a–1c are graphical illustrations of a method for forming thin-film magnetic head sliders, according to the prior art.
Figure 1B:
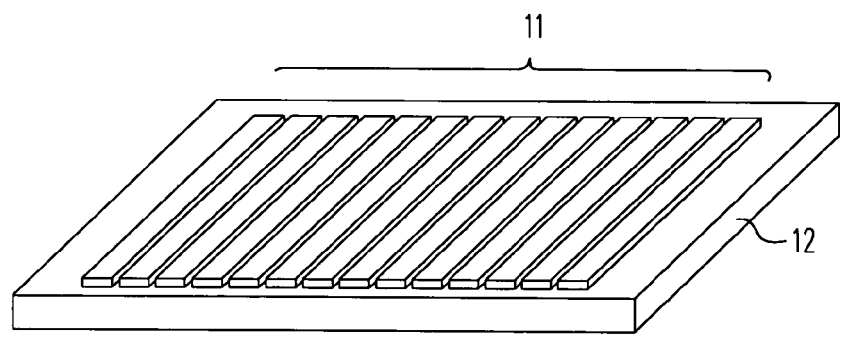
Figure 1C:
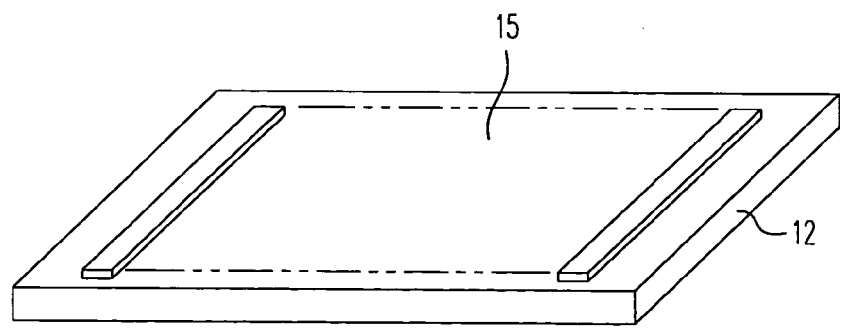

Referring now to the drawings and in particular to FIGS. 1a–1c, there are depicted graphical illustrations of a method for forming thin-film magnetic head sliders, according to the prior art. Initially, a group of magnetic heads is processed to a bar shape, called a row. Normally, this is done by cutting the wafer into pieces from which the rows are then cut. Various lapping/polishing operations are performed on the rows to define the final dimensions of the recording head elements and to prepare a smooth, flat surface for etching of the air-bearing surface (ABS). Generally, ten to fifty magnetic heads are included in each of rows 11. Rows 11 are collectively placed upon a base 12, typically known as a carrier, which is covered by a thermoplastic material 13, as shown in FIG. 1a. Base 12 can be sheet-like shaped or block shaped, and can be made of aluminum, stainless steel, or ceramic or the like.

Thermoplastic material 13 is commonly used to temporarily hold rows 11 to base 12. Thermoplastic material 13 is applied in sheet form onto base 12. Once rows 11 have been placed upon thermoplastic material 13, rows 11 are pressed into thermoplastic material 13 under pressure at elevated temperature such that rows 11 are partially embedded in thermoplastic material 13. The assembly (i.e., rows 11, base 12 and thermoplastic material 13) is cooled to achieve adhesion between rows 11 and base 12, as depicted in FIG. 1b. At this point, it is necessary to fill the spaces between rows 11, which have not been completely filled by thermoplastic material 13. Such is accomplished by a step called planarization, which is performed by covering rows 11 with a temporary tape and filling the underlying space with a liquid polymer, which, through surface tension, is drawn between rows 11. Once the liquid is solidified, the tape is removed and rows 11 are supported in a relatively flat and coplanar assembly.

Next, an appropriate resist material is coated onto rows 11, and is subsequently exposed and developed, thereby obtaining a resist mask 15 that reflects the cavity pattern, as shown in FIG. 1c. Then, a dry etching process, such as reactive ion etching or ion milling, is used to etch a part of rows 11 to obtain the desired cavity shape. This process may be repeated to give two or more etch depths on the ABS.

Finally, once the etched rows 11 are removed from the carriers, through solvent and/or thermal exposure, each of the etched rows 11 is cut to form individual magnetic heads on sliders having etched air-bearings.

In earlier embodiments of this process using liquid photoresist, the degree of flatness and coplanarity of the rows were sufficient to allow liquid photoresist to be applied to the assembly, and hence permit photolithographic processing. However, with the current generation of recording head sliders, the increased dimensional precision for the etched features of the ABS requires extremely uniform photoresist thickness. Otherwise, the air-bearing will not function correctly. Sufficient resist uniformity can only be obtained when the assembly of rows has a coplanarity comparable to that of the resist thickness being spun. The resist uniformity may be insufficient, for example, when a particularly thin resist layer is required. Also, post-etch cleaning processes in multi-etch process sequences are required that partially remove the planarization, thereby excessively degrading the coplanarity.

One prior art solution has been the usage of dry film resist, which is pressed onto the top of the rows, thereby accommodating non-planar surfaces. Such dry film resist is of a negative tone, compared to the positive tone resist used normally for ABS etching. Unfortunately, one aspect of the etching process results in a particular defect, known as fences, which is not observed for positive tone resists. The precision of the modem air-bearing precludes the presence of fences in the etched ABS. Therefore, it is necessary to achieve a very flat surface of rows plus planarization material onto which liquid positive tone resist can be spun, or another means of applying a positive tone photoresist that is not sensitive to lack of planarity must be found.

The present invention solves the above-mentioned problems by providing a method for coating a uniform resist layer onto a group of non-planar sliders bonded on a rectangular carrier. The method of the present invention involves spin-coating a resist layer, preferably a positive tone resist, on a flat medium with low surface energy, and then transplanting the resist layer onto a group of sliders by an application of heat and pressure. The flat medium facilitates the coating of a uniform resist layer while its low surface energy with respect to the surface of the sliders allows the transfer of the resist layer from the flat medium onto the sliders. Poly-dimethyl siloxane (PDMS) is preferably used as the transfer medium.

Figure 2A:
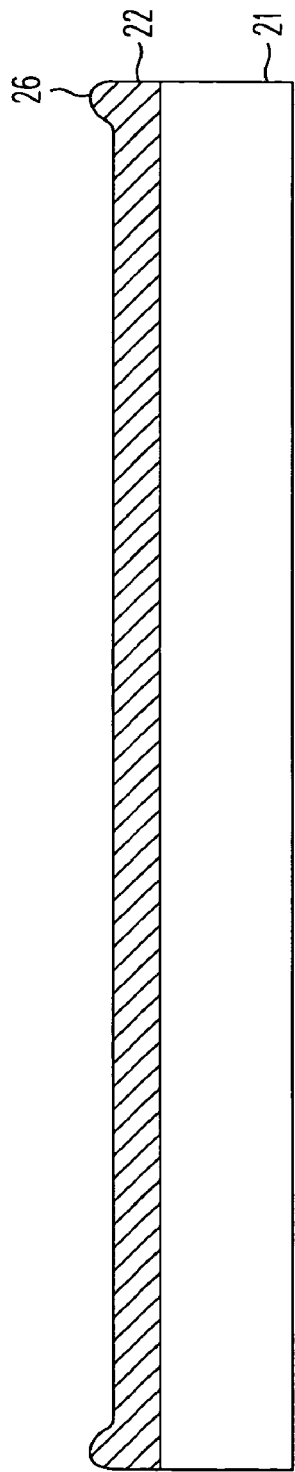

With reference now to FIGS. 2a–2f, there are depicted graphical illustrations of a method for manufacturing thin-film magnetic head sliders, in accordance with a preferred embodiment of the present invention. Initially, a PDMS layer 22 is spun on a silicon wafer 21, as shown in FIG. 2a. Typically, a beaded edge 26 is left after the PDMS layer 22 has been deposited. Silicon wafer 21 is preferably a five-inch wafer. After the completion of spinning PDMS layer 22 on silicon wafer 21, silicon wafer 21 is placed in an oven at a temperature of approximately 110 degree Celsius for the duration of approximately 8 minutes for the purpose of curing PDMS layer 22. Other curing cycles of longer times at lower temperature are also acceptable.

Figure 2B:
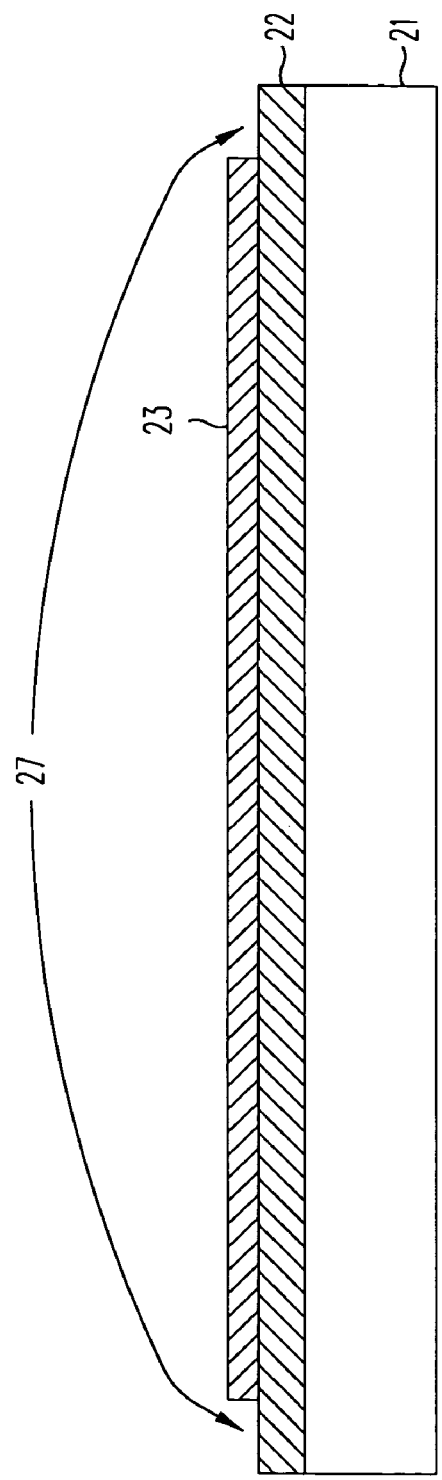

Then, a resist layer 23 is spun onto PDMS layer 22, during which time an edge bead removal process is performed to prevent the resist layer 23 from extending to the edge of PDMS layer 22, as shown in FIG. 2b. FIG. 2b shows the result 27 of removing the edge bead. Resist layer 23 is preferably a positive tone resist, although negative tone resists may also be used, if desirable. After the completion of spinning resist layer 23 on PDMS layer 22, silicon wafer 21 is placed in an oven at a temperature between approximately 40 degree Celsius to 60 degree Celsius for post applied bake. The choice of post-bake cycle is dependent on the resist used.

Figure 2C:
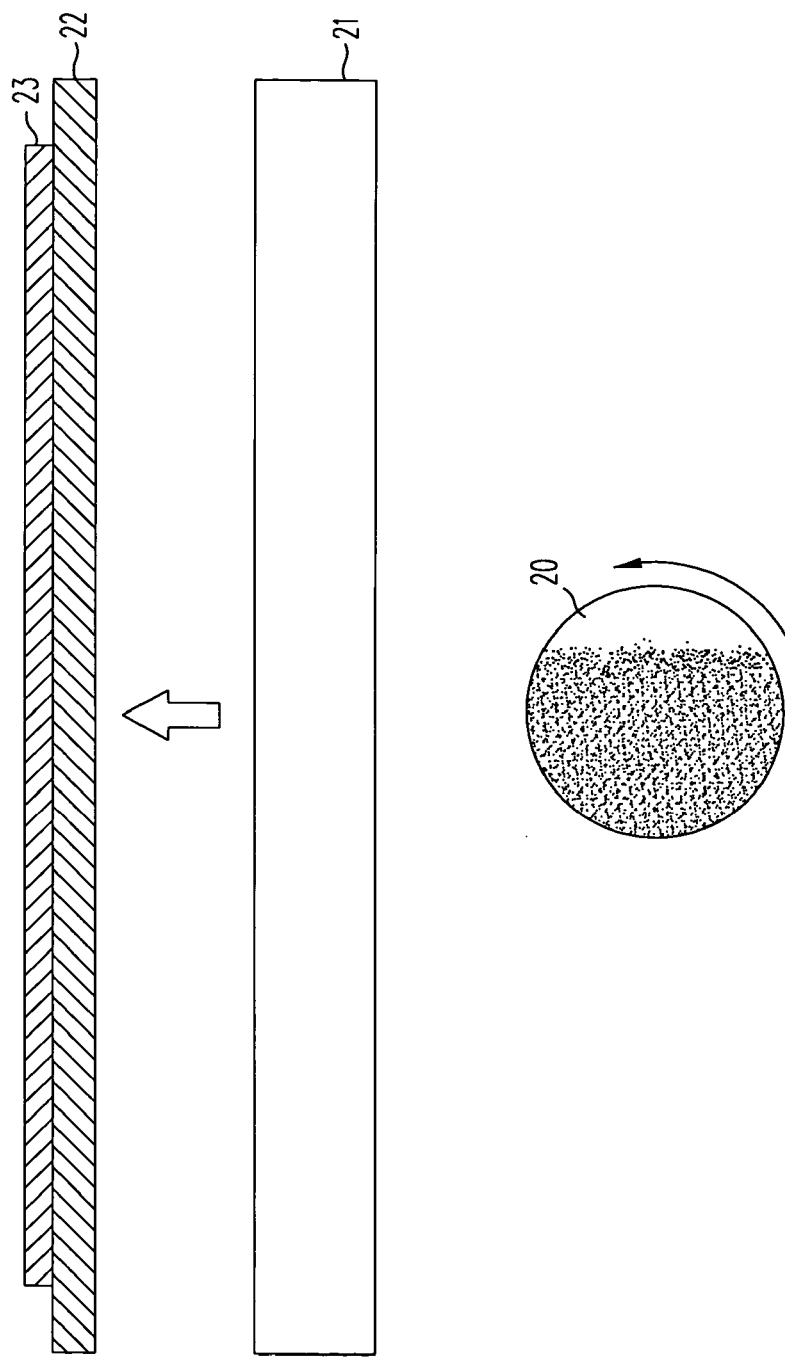
Figure 2D:
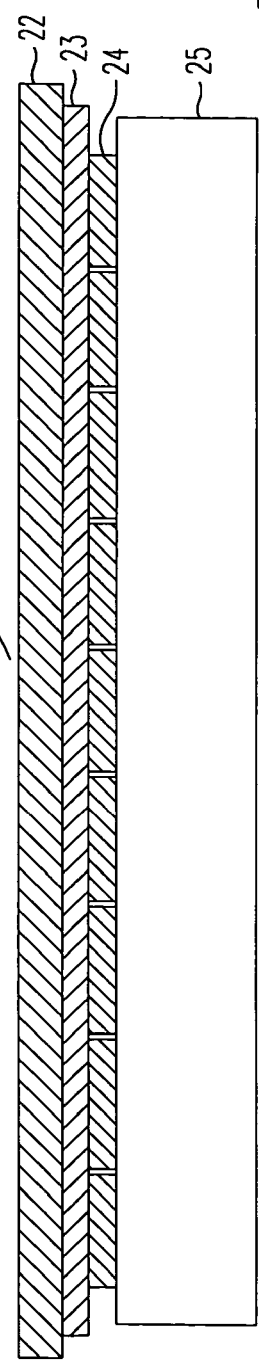

Next, the combined resist layer 23/PDMS layer 22 is peeled off from silicon wafer 21, as shown in FIG. 2c. With the use of a roller 20, combined resist layer 23/PDMS layer 22 is applied onto a group of magnetic heads 24 resting on a carrier 25, as shown in FIG. 2d. For the application of the combined resist layer 23/PDMS layer 22 onto magnetic heads 24, the temperature is preferably 25 degree Celsius and the pressure is preferably 1 psi.

Subsequently, PDMS layer 22 is peeled off from resist layer 23, as shown in FIG. 2e. As a result, resist layer 23 is left on top of magnetic heads 24, as shown in FIG. 2f.

Figure 3:
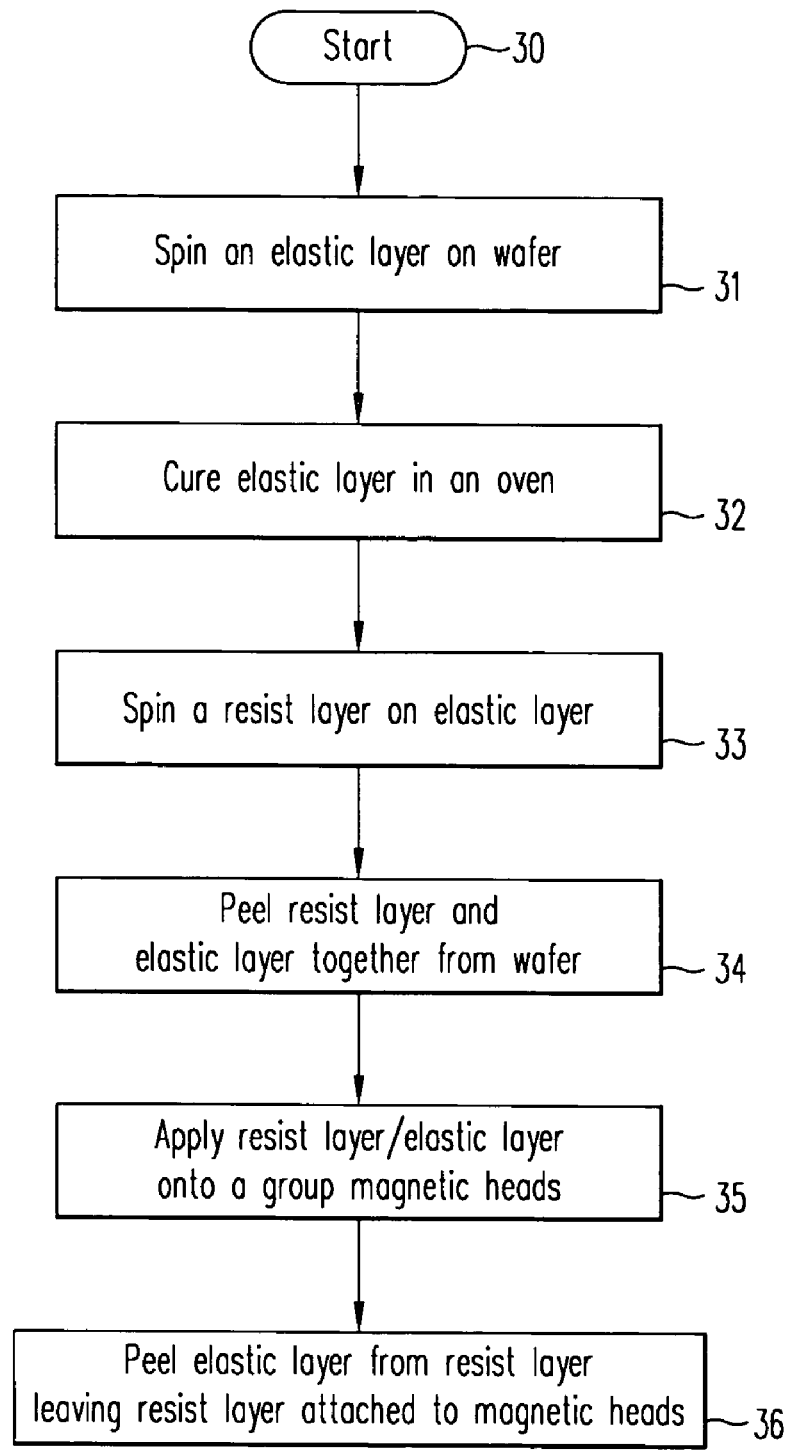
FIG. 3 is a high-level logic flow diagram of a method for coating a resist layer onto a group of non-planar magnetic head sliders, in accordance with a preferred embodiment of the present invention.

Referring now to FIG. 3, there is depicted a high-level logic flow diagram of a method for coating a resist layer onto a group of non-planar magnetic head sliders, in accordance with a preferred embodiment of the present invention. Starting at block 30, an elastic layer, such as a PDMS layer, is initially spun on a wafer, as shown in block 31. Then, the elastic layer is cured at approximately 110 degree Celsius for about 8 minutes, as depicted in block 32. Next, a resist layer is spun on the elastic layer, as shown in block 33. Both the resist layer and the elastic layer are subsequently peeled off together from the wafer, as depicted in block 34. Next, the peeled resist layer/elastic layer is applied onto a group of magnetic heads with the resist layer in direct contact with the magnetic heads, as shown in block 35. The application of the peeled resist layer/elastic layer onto the magnetic heads is preferably performed by a roller. Finally, the elastic layer is peeled off from the resist layer such that the resist layer remains attaching to the magnetic heads, as depicted in block 36.

As has been described, the present invention provides a method for manufacturing thin-film sliders for magnetic heads to be used in magnetic storage devices. PDMS has two very desirable properties that makes PDMS a good medium for transferring a resist layer. First, PDMS has a very low surface energy that facilitates resist transfer. Second, PDMS can be molded from liquid to any shape and size. In addition, PDMS is re-usable.

Spin coating, as described above, is a preferred method for forming a PDMS layer of a wafer. An alternative method to spin coating is molding PDMS material on a large sheet and the sheet is then cut to a required size. The molded PDMS layer can be made sufficiently stiff so that the resist layer can be spun coated directly onto the molded PDMS layer without the use of the wafer.

Another advantage of the resist transfer process of the present invention is that the resist uniformity at the comers of rectangular carriers is improved. This is in contrast to yield losses from non-uniform resist accumulation or edge-beading at the carrier corners during spin-coating.

While the invention has been particularly shown and described with reference to a preferred embodiment, it will be understood by those skilled in the art that various changes in form and detail may be made therein without departing from the spirit and scope of the invention.

What is claimed is:

1. A method for coating an uniform resist layer onto a plurality of non-planar sliders, said method comprising:
   spinning an elastic layer on a wafer;
   curing said elastic layer;
   spinning a resist layer on said elastic layer;
   peeling said resist layer and said elastic layer together off from said wafer;
   applying said peeled resist layer and elastic layer onto a plurality of magnetic heads with said resist layer in direct contact with said plurality of magnetic heads; and
   peeling said elastic layer off from said resist layer such that said resist layer remains attaching to said plurality of magnetic heads.

2. The method of claim 1, wherein said elastic layer is poly-dimethyl siloxane.

3. The method of claim 1, wherein said resist layer is a positive tone resist layer.

4. The method of claim 1, wherein said wafer is a silicon wafer.

5. The method of claim 1, wherein said curing further includes curing said elastic layer at approximately 110 degree Celsius for about 8 minutes.

6. The method of claim 1, wherein said applying further includes applying with a roller.

7. The method of claim 6, wherein said applying further includes applying with a roller at approximately 25 degree Celsius and pressure at approximately 1 psi.

8. The method of claim 1, wherein said method further includes baking said resist layer at a temperature between approximately 40 degree Celsius to 60 degree Celsius after said resist layer has been spun on said elastic layer.

* * * * *